United States Patent [19]

Itsuzaki et al.

[11] Patent Number: 5,446,801
[45] Date of Patent: Aug. 29, 1995

[54] RECOGNIZING METHODS OF CIRCULAR HOLES

[75] Inventors: Yoshihiro Itsuzaki, Kashihara; Misuzu Takano, Hirakata; Kinji Horikami, Suita; Masaya Nakao, Moriguchi, all of Japan

[73] Assignee: Matsushita Electric Industrial Co., Ltd., Osaka, Japan

[21] Appl. No.: 203,291

[22] Filed: Mar. 1, 1994

[30] Foreign Application Priority Data

Mar. 2, 1993 [JP] Japan ................... 5-040998

[51] Int. Cl.⁶ .................................. G06K 9/00
[52] U.S. Cl. ........................ 382/141; 348/295; 356/400
[58] Field of Search .............. 382/8, 48, 45, 22; 348/94, 95; 356/373, 375, 400

[56] References Cited

U.S. PATENT DOCUMENTS

| | | | |
|---|---|---|---|
| 3,555,172 | 1/1971 | Heinz | 348/95 |
| 4,596,037 | 6/1986 | Bouchard et al. | 382/8 |
| 4,643,579 | 2/1987 | Toriumi et al. | 348/95 |
| 4,647,208 | 3/1987 | Bieman | 348/94 |
| 4,750,836 | 6/1988 | Stein | 356/400 |
| 5,214,492 | 5/1993 | LoBianco et al. | 356/400 |

Primary Examiner—Leo H. Boudreau
Attorney, Agent, or Firm—Wenderoth, Lind & Ponack

[57] ABSTRACT

Positions of overlapping first and second circular holes of respective first and second objects are detected, the first and second objects to be screwed together by a robotic screwing mechanism. An upper surface of the first object is viewed with an image pick-up device to obtain an image of the first circular hole and a partial image of the second circular hole which overlaps the image of the first circular hole. Two maximally spaced-apart boundary points from among the boundary points along an outer periphery of the partial image are detected. First and second circles within an image frame are defined which include the two maximally spaced-apart boundary points and which have respective centers of gravity which are symmetric to each other relative to a line segment connecting the maximally spaced-apart boundary points. The positions of the first and second circular holes are detected based on the defined first and second circles within the image frame.

9 Claims, 6 Drawing Sheets

RECOGNIZING METHODS OF CIRCULAR HOLES

BACKGROUND OF THE INVENTION

The present invention relates to a recognizing method and apparatus of circular holes to be utilized, e.g., in a visual recognizing device for a screwing robot whereby each position of two circular overlapping holes is automatically recognized by processing images of the holes taken by a TV camera or the like.

The aforementioned type of device has been provided and widely employed lately as a visual recognizing device for a screwing robot.

FIG. 7 shows the constitution of a circular hole recognizing device used hitherto. Two circular holes formed in two members to be screwed together are picked up by a visual sensor 100 such as a TV camera or the like, and the obtained image signals are converted to digital values at an image input part 101. The image data after conversion is stored in an image memory 102. The image data in the image memory 102 is displayed at an image display part 103, and at the same time fed and processed at an image processing part 104 to recognize each position of the circular holes.

The image processing part 104 has, in order to process the image data as above, a hole area detecting means 105 for detecting an area of each circular hole and a gravity center detecting means 106 for detecting the center of gravity of the area of the circular hole detected by the detecting means 105. Referring to FIG. 8, the areas of the two circular overlapping holes (j) and (k) and the center of gravity (l) of the areas are automatically detected in the image processing part 104. Accordingly, 10 the robot is able to perform automatic screwing on the basis of the above-described recognition.

However, the two circular holes (j) and (k) are not always overlapped as perfectly as illustrated in Fig. 8. If the circular holes (j) and (k) partially overlap at an overlapping area (m) as shown in FIG. 9, the conventional device detects only the area of the upper circular hole (j), or the overlapping area (m) in some cases. The center of gravity of the upper circular hole (j) is not coincident with that of the lower circular hole (k). Also, even if the center of gravity (n) of the overlapping area (m) is detected, the center of gravity (n) does not correspond to that of any of the upper and lower circular holes (j) and (k).

As a result, the robot is unable to screw the members correctly if based on the above recognition of the center of gravity.

SUMMARY OF THE INVENTION

The object of the present invention is therefore to provide an improved recognizing method of circular holes and an apparatus for carrying out the method which are capable of accurately recognizing overlapping circular holes.

In accomplishing these and other objects, according to a first aspect of the present invention, there is provided a recognizing method of circular holes which comprises the steps of: picking up images of two circular overlapping holes having the same radius by an image pick-up device; detecting boundary points of an outer periphery of an area where the two holes partially overlap from the picked-up image; detecting the two most spaced-up boundary points which are separated the most from among the boundary points of the outer periphery; determining that the holes are circles passing the two boundary points and having the centers of gravity symmetric to each other via a segment connecting the two boundary points; and detecting positions of the overlapping circular holes based on the result of the determining step.

According to a another aspect of the present invention, there is provided a recognizing method of circular holes which comprises the steps of: picking up images of two circular overlapping holes up and down and having different radii by an image pick-up device; detecting boundary points of an outer periphery of an area where the two holes partially overlap from the picked-up image; detecting, two most spaced-apart boundary points which are separated the most from among the boundary points of the outer periphery; detecting two boundary points of the outer periphery of the overlapping area which a bisector of a segment connecting the two most spaced-apart boundary points passes; determining that one of the holes is a circle passing one of the boundary points of the outer periphery and the two longest boundary points, and the other of the holes is a circle passing the other of the boundary points of the outer periphery and the two longest boundary points; and detecting positions of the overlapping circular holes based on the result of the determining step.

According to yet another aspect of the present invention, there is provided a recognizing method of circular holes which comprises the steps of: picking up images of two circular overlapping holes up and down by an image pick-up device, a lower circular hole of the two circular holes being smaller than an upper circular hole of the two circular holes; detecting boundary points of an outer periphery of an area where the two holes partially overlap from the picked-up image; detecting the two most spaced-apart boundary points which are separated the most from among the boundary points of the outer periphery; detecting, when the two most spaced-apart boundary points of the overlapping area are inside the upper circular hole, a position of the lower circular hole from the two most spaced-apart boundary points and the radius of the lower circular hole, and; detecting a position of the upper circular hole from the radius of the upper circular hole and two boundary points separated the most in a range of boundary points of the outer periphery outside the overlapping area among the boundary points of the outer periphery of the lower circular hole.

According to still another aspect of the present invention, there is provided a recognizing apparatus of circular holes which comprises: an image pick-up device for picking up images of two circular overlapping holes; an image storing device for storing the images picked up by the image pick-up device; a hole area detecting means for detecting an area where the two holes partially overlap from data of the picked-up images stored in the storing means; an outer peripheral boundary point detecting means for detecting boundary points of an outer periphery of the area; a spaced-apart boundary point detecting means for detecting the two most spaced-apart boundary points which are separated the most from the boundary points of the outer periphery; and an upper and lower circular hole detecting means for detecting positions of the overlapping circular holes based on the two most spaced-apart boundary points and the radiuses of the two circular holes.

BRIEF DESCRIPTION OF THE DRAWINGS

These and other objects and features of the present invention will become clear from the following description taken in conjunction with the preferred embodiments thereof with reference to the accompanying drawings, in which.

DETAILED DESCRIPTION OF THE PREFERRED EMBODIMENTS

Figure 1:
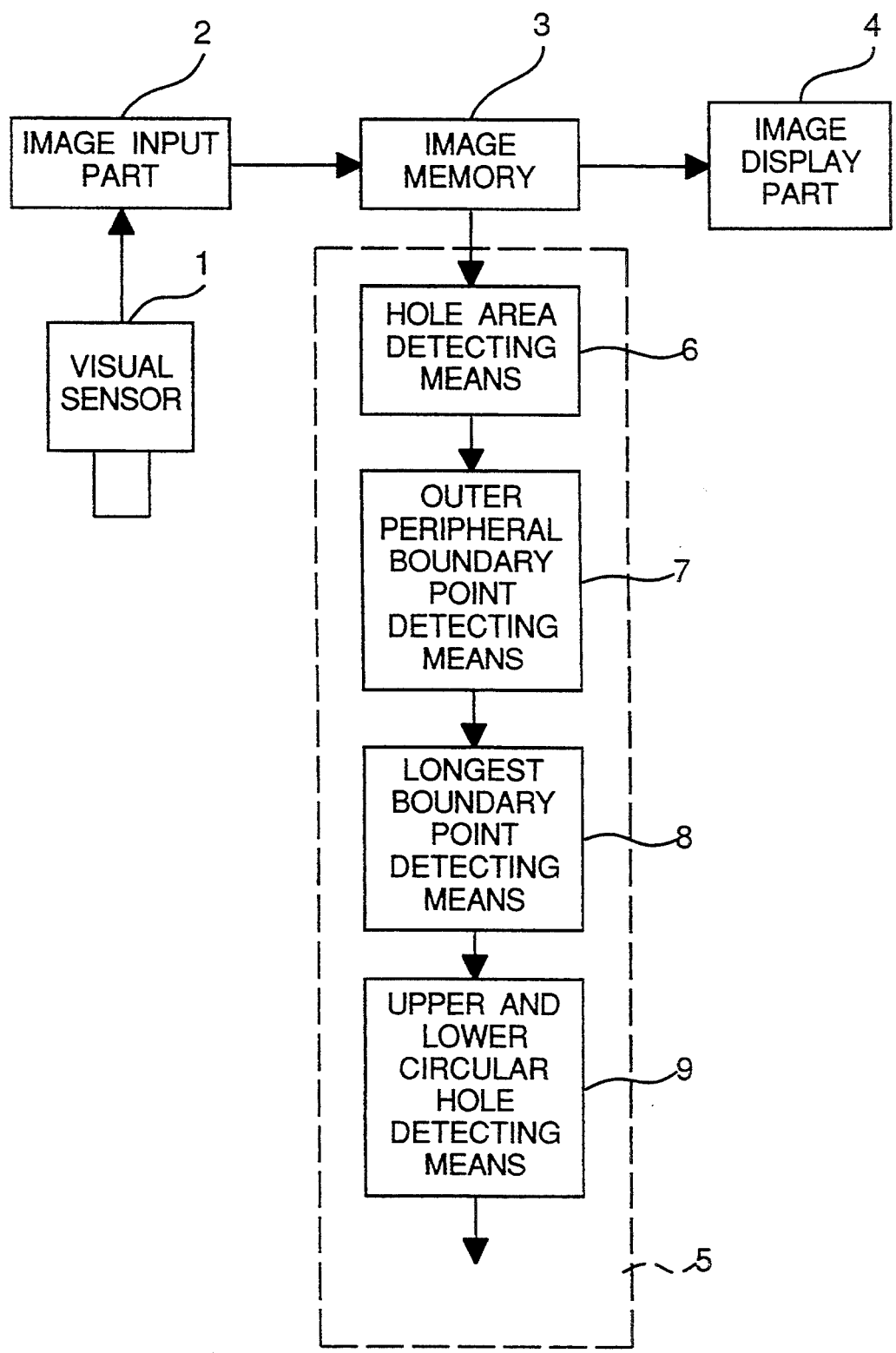
FIG. 1 is a block diagram schematically showing the constitution of an example of a circular hole recognizing device for executing a recognizing method of an embodiment of the present invention.

Before the description of the present invention proceeds, it is to be noted that like parts are designated by like reference numerals throughout the accompanying drawings.

A recognizing method of a circular hole according to one embodiment of the present invention will be depicted with reference to FIGS. 1 through 6.

FIG. 1 is a schematic structural diagram of a recognizing device for realizing a recognizing method of the embodiment. The recognizing device of FIG. 1 includes a visual sensor 1 such as a TV camera or the like for picking up images of circular holes as objects to be recognized by the device, an image input part 2 for digitally converting the image data obtained by the visual sensor 1, an image memory 3 for storing the converted image data, an image display part 4 for displaying as an image the stored image data in the image memory 3, and an image processing part 5 for processing the image data stored in the image memory 3 so as to recognize the position of the circular holes.

In order to execute the recognizing method of the embodiment, the image processing part 5 is provided with a hole area detecting means 6 for detecting areas of circular holes an outer peripheral boundary point detecting means 7 for detecting boundary points of the outer periphery of the areas of the circular holes detected by the hole area detecting means 6, a maximum spaced-apart boundary point detecting means 8 for detecting two maximum spaced-apart boundary points which are spaced-apart from the largest distance from among the boundary points of the outer periphery detected by the boundary point detecting means 7, and a hole detecting means 9 for detecting the positions of the two circular overlapping holes on the basis of the maximum spaced-apart boundary points detected by the maximum spaced-apart boundary point detecting means 8 and the radius of the to-be-detected circular holes.

Figure 2:
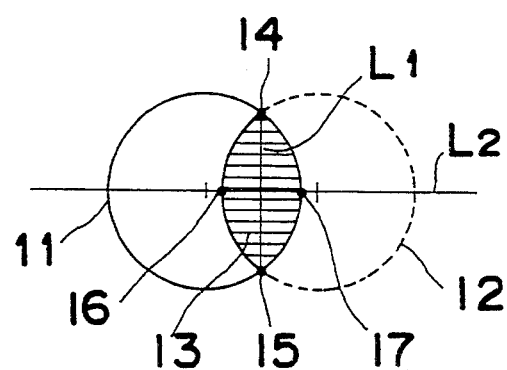
FIG. 2 is a diagram explanatory of the overlapping state of circular holes to be detected by the device and maximum spaced-apart boundary points of an overlapping area detected according to the method of the embodiment.

FIG. 2 shows an example of the state when an upper circular hole 11 to be screwed of an upper plate is partially overlapped with a lower circular hole 12 of a lower plate. When circular holes 11, 12 in the state are picked up by this visual sensor 1, a portion plotted by a broken line does not appear in the image.

Figure 6:
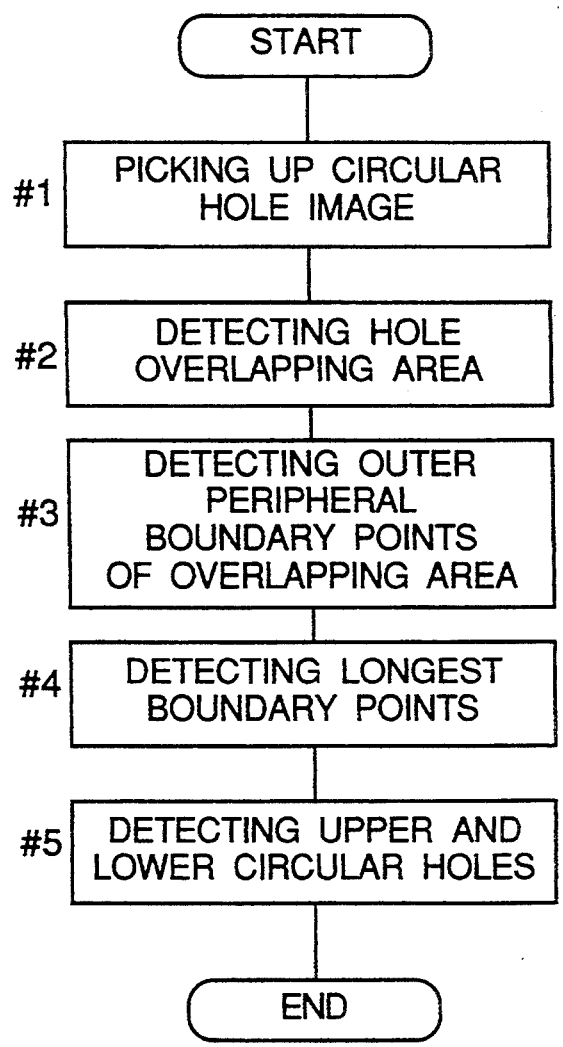
FIG. 6 is a flow chart of the recognizing method of a circular hole according to the embodiment of the present invention.
Figure 7:
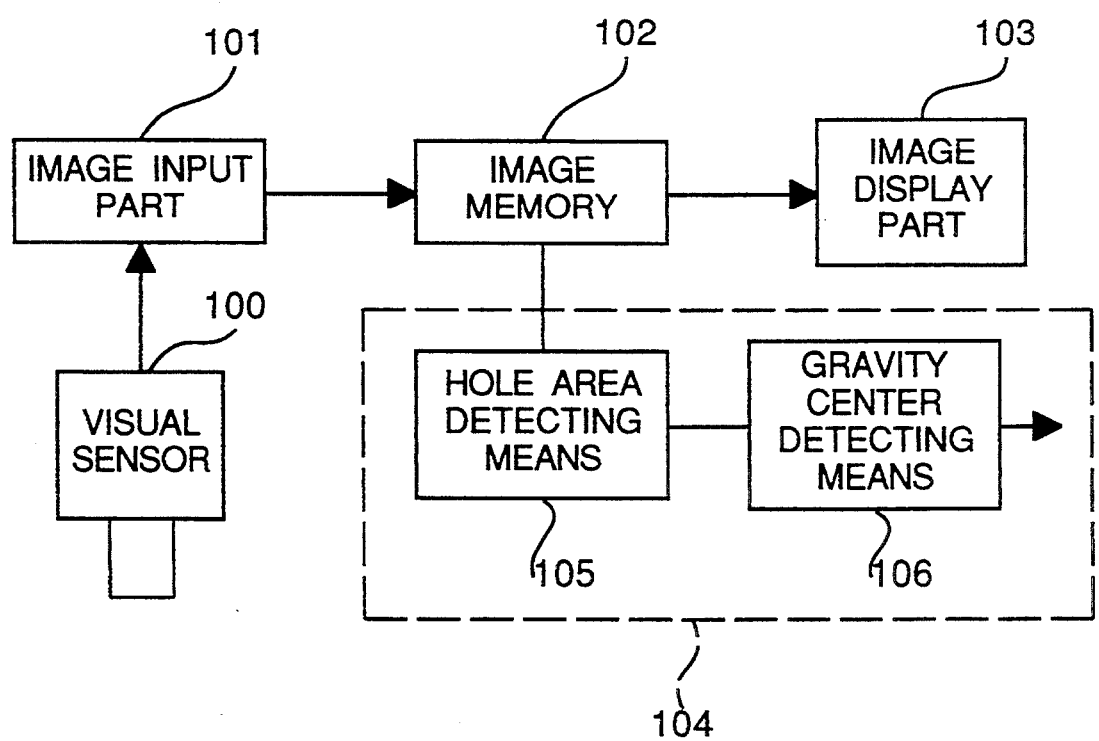
FIG. 7 is a block diagram showing the schematic configuration of a conventional hole recognizing device.
Figure 8:
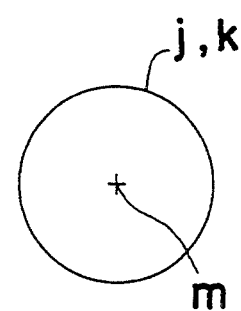
FIG. 8 is a diagram indicating the normal overlapping state of upper and lower holes and the center of gravity.
Figure 9:
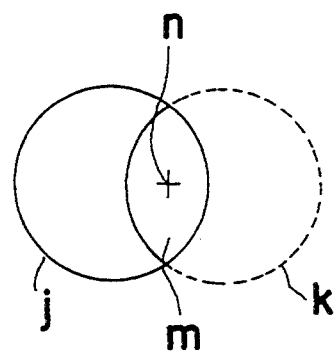
FIG. 9 is an explanatory diagram when the partially overlapping position of upper and lower circular holes is to be detected.

The recognizing method of the circular holes 11, 12 will be concretely described with reference to a flow chart of FIG. 6.

At step #1, the circular holes 11, 12 are picked up by the visual sensor 1, and then the digitized image data is loaded in the image memory 3 via the image input part 2.

At step #2, an overlapping area 13 where the upper and lower circular holes 11, 12 overlap each other is detected by the hole area detecting means 6. Supposing that the interior of the area is darker than the other area, the overlapping area 13 can be separately detected from the background as a dark area of a lower value than the whole image of the circular holes 11, 12. In the case where there are present a plurality of overlapping areas, each area is numbered for the purpose of distinction and then the size of each area is calculated, so that only the overlapping area 13 of the size within a certain range can be detected. On the other hand, if the interior of the area is brighter than the exterior thereof, the overlapping area 13 can be separated and distinguished from the background as a bright area relative to the whole image of the circular holes 11, 12.

At the subsequent step #3, boundary points of the outer periphery of the detected overlapping area 13 are detected by the outer peripheral boundary point detecting means 7. For example, a contour of the overlapping area 13 is traced to detect the boundary points of the outer periphery of the area 13. The boundary points can be detected at higher speeds from coordinates based on a starting point and an end point of the run-length data calculated from the image data obtained at step #1.

At step #4, the two boundary points 14, 15 which are positional separated from among the outer peripheral boundary points are detected by the maximum spaced-apart boundary point detecting means 8. In order to detect the two boundary points 14, 15, for instance, the distance of the boundary points is calculated for all the boundary points of the outer periphery and then the two boundary points separated by the longest distance are selected.

Figure 3:
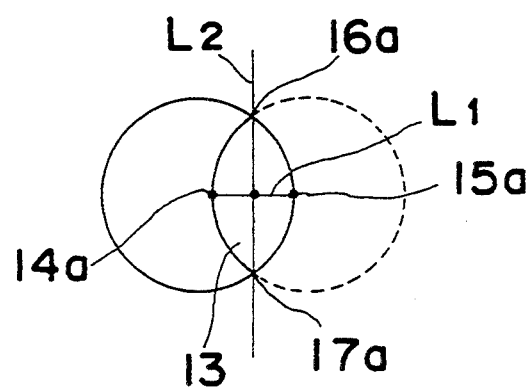
FIG. 3 is a diagram explanatory of a different detecting method of maximum spaced-apart boundary points from FIG. 2.

On the other hand, referring to FIG. 3, if the two boundary points 14a, 15a in the overlapping direction of the upper and lower circular holes 11, 12 in the overlapping area 13, namely, in the horizontal direction in FIG. 3 are to be detected, it is sufficient to calculate only the distance components in the horizontal direction of the boundary points, therefore making it possible to detect the two longest boundary points at higher speeds in comparison with the case where the distance is calculated for all the boundary points. This applies also to the case where only the distance components in a direction at right angles to the overlapping direction of the upper and lower circular holes 11, 12, i.e., in the vertical direction are calculated to thereby to detect the two boundary points as shown in the embodiment of FIG. 2.

Figure 4:
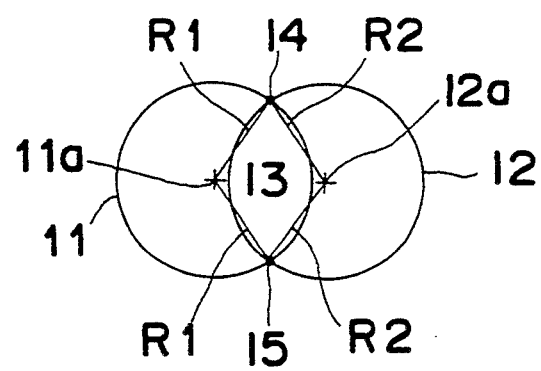
FIG. 4 is an explanatory diagram when the positions of upper and lower circular holes are detected by the method of the embodiment.

Finally, at step #5, each position of the upper and lower circular holes 11, 12 is detected by the hole detecting means 9 based on either the two boundary points 14, 15 of FIG. 2 or the two boundary points 14a, 15a of FIG. 3 detected at step #4. More specifically, in the case of FIG. 2, each position of the holes is detected from the boundary points 14, 15, and the boundary points 16, 17 of the outer periphery where a bisector L2 orthogonal to a segment L1 connecting the boundary points 14, 15 passes. That is, the lower circular hole 12 is detected as a circle passing the boundary points 14, 15, 16, while the upper circular hole 12 is recognized as a circle passing the boundary points 14, 15, 17, without using radius data. The positional data of the upper and lower circular holes 11, 12 are operated from the positions of the boundary points 14, 15 on the coordinates. On the other hand, in the case of FIG. 3, boundary points 16a, 17a are obtained by a segment L1 connecting the boundary points 14a, 15a and a bisector L2 orthogonal to the segment L1 from the known boundary points 14a, 15a, so that the positions of the upper and lower circular holes 11, 12 are detected. Needless to say, although it is possible to detect the boundary points 14–17 of FIG. 2 or the boundary points 14a–17a of FIG. 3 by detecting the maximum spaced-apart boundary points in the vertical direction or in the horizontal direction, it is necessary to specify the overlapping direction. Thereafter, the positions 11a, 12a of the center of gravity of the circular holes 11, 12 are obtained from the radiuses R1, R2 of the circular holes 11, 12, respectively, as indicated in FIG. 4.

Through the detection of the position of each circular hole 11, 12 as above, the state or the degree of the positional shift is detected to determine whether to perform screwing. Since best position for screwing can be detected, the robot can accomplish screwing without fail.

If the two circular holes have the same diameter, it is unnecessary to detect at which side of the segment L1 the circular holes 11, 12 are present. Therefore, the positions 11a, 12a of the center of gravity of the circular holes 11, 12 can be specified and detected by a further simpler operation based on the boundary points 14, 15 and the diameter of the circular holes 11, 12 as shown in FIG. 4.

Figure 5:
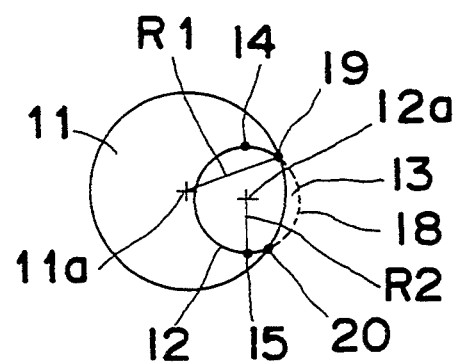
FIG. 5 is an explanatory diagram of a different detecting method.

Referring to FIG. 5, if the upper circular hole 11 is larger than the lower circular hole 12 and moreover, the boundary points 14, 15 of the overlapping area 13 are inside the upper circular hole 11, since it is specified that the centers of gravity of both of the upper and lower circular holes 11, 12 are positioned left of the boundary points 14, 15 in the drawing, the position of the lower circular hole 12 and the center of gravity 12a thereof can be quickly detected from the longest boundary points 14, 15 and the radius R2 of the lower circular hole 12. Moreover, boundary points 18 of the outer periphery of the lower circular hole 12 is compared with the boundary points of the outer periphery of the overlapping area 13, and then, the position of the upper circular hole 11 and the center of gravity 11a can be detected promptly from the radius R1 of the upper circular hole 11 and two boundary points 19, 20 separated by the longest distance in a range of the boundary points of the outer periphery indicated by a broken line where the boundary points 18 of the outer periphery of the lower circular hole 12 do not overlap with the boundary points of the outer periphery of the overlapping area 13.

Although the foregoing description of the embodiment is related to the recognition of the position of screwing holes, the invention is applicable to the recognition of the position of the other kinds of holes in a similar overlapping state.

According to the first aspect of the present invention, when the overlapping two circular holes have the same diameter, the circular holes are recognized as circles passing the two longest boundary points in the overlapping area and having the centers of gravity symmetric to each other via a line connecting the longest boundary points. The two circular holes can be specified and detected by operations irrespective of the overlapping state thereof, thus improving the detecting accuracy. Screwing by a robot utilizing the present invention is performed for sure. Moreover, since the operations are carried out considerably easily and promptly, the efficiency is improved.

In accordance with the second aspect of the present invention, when the two circular holes are different in diameter, by detecting the two longest boundary points of the overlapping area and further two boundary points of the outer periphery of an overlapping area where a bisector of a segment connecting the above two longest boundary points passes, one is recognized as a circle passing one boundary point of the outer periphery and the two longest boundary points and the other is recognized as a circle passing the other boundary point of the outer periphery and the two longest boundary points. Therefore, the circular holes can be specified and detected by operations irrespective of the overlapping state or the difference of the diameters, that is, the present method is capable of dealing with many more conditions.

In the third aspect of the present invention, even when the lower circular hole is smaller than the upper circular hole and the longest boundary points of the overlapping area are within the upper circular hole, the position of the lower circular hole can be detected from the two longest boundary points and the radius of the lower circular hole. At the same time, the position of the upper circular hole is specified and detected from the radius of the upper circular hole and two points separated most in a range of the boundary points of the outer periphery of the lower circular hole outside the overlapping area.

Although the present invention has been fully described in connection with the preferred embodiment thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A method of automatically determining the positions of first and second circular holes having a same radius and respectively contained in first and second objects, the first object located over the second object such that first and second holes partially overlap one another, said method comprising:
    viewing an upper surface of the first object with an image pick-up device to generate image data indicative of a resultant image within an image frame, the resultant image including an image of the first circular hole and a partial image of the second circular hoe which overlaps the image of the first circular hole;

storing the image data in a memory;

retrieving the image data from said memory and subjecting the image data to data processing which includes (a) detecting boundary points along an outer periphery of the partial image, (b) detecting two maximally spaced-apart boundary points from among the boundary points, (c) defining first and second circles within the image frame including the two maximally spaced-apart boundary points and having respective centers of gravity which are symmetric to each other relative to a line segment connecting the maximally spaced-apart boundary points, and (d) detecting respective positions of the first and second circular holes based on the defined first and second circles within the image frame.

2. A method as claimed in claim 1, further comprising automatically controlling a robotic screwing mechanism which drives a screw through the first and second circular holes according to the detected positions of the first and second circular holes.

3. A method of automatically determining the positions of first and second circular holes respectively contained in first and second objects, the first object located over the second object such that first and second holes partially overlap one another, said method comprising:

viewing an upper surface of the first object with an image pick-up device to generate image data indicative of a resultant image within an image frame, the resultant image including an image of the first circular hole and a partial image of the second circular hole which overlaps the image of the first circular hole;

storing the image data in a memory;

retrieving the image data from said memory and subjecting the image data to data processing which includes (a) detecting boundary points along an outer periphery of the partial image, (b) detecting two maximally spaced-apart boundary points from among the boundary points, (c) detecting first and second additional boundary points from among the boundary points which are contained in a bisector line of a line segment connecting the two maximally spaced-apart boundary points, (d) defining a first circle within the image frame including the two maximally spaced-apart boundary points and the first additional boundary point, and a second circle within the image frame including the two maximally spaced-apart boundary points and the second additional boundary point, and (e) detecting respective positions of the first and second circular holes based on the defined first and second circles.

4. A method as claimed in claim 3, further comprising automatically controlling a robotic screwing mechanism which drives a screw through the first and second circular holes according to the detected positions of the first and second circular holes.

5. A method of automatically determining the positions of first and second circular holes respectively contained in first and second objects, the first object located over the second object such that first and second holes partially overlap one another, the first circular hole having a larger radius than that of the second circular hole, said method comprising:

viewing an upper surface of the first object with an image pick-up device to generate image data indicative of a resultant image within an image frame, the resultant image including an image of the first circular hole and a partial image of the second circular hole which overlaps the image of the first circular hole;

storing the image data in a memory;

retrieving the image data from said memory and subjecting the image data to data processing which includes (a) detecting boundary points along an outer periphery of the partial image, (b) detecting two maximally spaced-apart boundary points from among the boundary points along the outer periphery of the partial image, (c) detecting first and second additional boundary points from among the boundary points which are contained in a bisector line of a line segment connecting the two maximally spaced-apart boundary points, (d) defining, when the two maximally spaced-apart boundary points are within the image of the first circular hole, a second circle within the image frame including the maximally spaced-apart boundary points and having a radius of the second circular hole, and a first circle within the image frame having a radius of the first circular hole and including two of the boundary points which are spaced-apart the most from among a range of the boundary points of the partial image along an outer periphery of the image of the first circular hole, (e) defining, when the two maximally spaced-apart boundary points are located along the outer periphery the image of the first circular hole, the first and second circles within the image frame as including the two maximally spaced-apart boundary points and as having respective centers of gravity which are symmetric to each other relative to a line segment connecting the maximally spaced-apart boundary points, and (f) detecting respective positions of the first and second circular holes based on the defined first and second circles.

6. A method as claimed in claim 5, further comprising automatically controlling a robotic screwing mechanism which drives a screw through the first and second circular holes according to the detected positions of the first and second circular holes.

7. An apparatus for automatically determining the positions of first and second circular holes respectively contained in first and second objects, the first object located over the second object such that the first and second holes partially overlap one another, said apparatus comprising:

an image pick-up device including an image sensor and means for generating image data responsive to said image sensor;

a data memory operatively coupled to said image pick-up device;

a processing means, operatively coupled to said data memory, for processing object image data stored in said data memory, said object image data indicative of an image obtained by said image sensor of an upper surface of the first object including an image of the first circular hole and a partial image of the second circular hole which overlaps the image of the first circular hole, said processing means for (a) detecting boundary points along an outer periphery of the partial image, (b) detecting two maximally spaced-apart boundary points from among the boundary points, (c) defining first and second circles including the two maximally spaced-apart boundary points and having respective centers of gravity which are symmetric to each other relative to a line segment connecting the maximally spaced-apart boundary points, and (d) detecting respective positions of the first and second circular holes based on the defined first and second circles.

8. An apparatus for automatically determining the positions of first and second circular holes respectively contained in first and second objects, the first object located over the second object such that the first and second holes partially overlap one another, said apparatus comprising:

an image pick-up device including an image sensor and means for generating image data responsive to said image sensor;

a data memory operatively coupled to said image pick-up device;

a processing means, operatively coupled to said data memory, for processing object image data stored in said data memory, said object image data indicative of an image obtained by said image sensor of an upper surface of the first object including an image of the first circular hole and a partial image of the second circular hole which overlaps the image of the first circular hole, said processing means for (a) detecting boundary points along an outer periphery of the partial image, (b) detecting two maximally spaced-apart boundary points from among the boundary points, (c) detecting first and second additional boundary points from among the boundary points which are contained in a bisector line of a line segment connecting the two maximally spaced-apart boundary points, (d) defining a first circle including the two maximally spaced-apart boundary points and the first additional boundary point, and a second circle including the two maximally spaced-apart boundary points and the second additional boundary point, and (e) detecting respective positions of the first and second circular holes based on the defined first and second circles.

9. An apparatus for automatically determining the positions of first and second circular holes respectively contained in first and second objects, the first object located over the second object such that the first and second holes partially overlap one another, said apparatus comprising:

an image pick-up device including an image sensor and means for generating image data responsive to said image sensor;

a data memory operatively coupled to said image pick-up device;

a processing means, operatively coupled to said image memory, for processing object image data stored in said data memory, said object image data indicative of an image obtained by said image sensor of an upper surface of the first object including an image of the first circular hole and a partial image of the second circular hole which overlaps the image of the first circular hole, said processing means for (a) detecting boundary points along an outer periphery of the partial image, (b) detecting two maximally spaced-apart boundary points from among the boundary points along the outer periphery of the partial image, (c) detecting first and second additional boundary points from among the boundary points which are contained in a bisector line of a line segment connecting the two maximally spaced-apart boundary points, (d) defining, when the two maximally spaced-apart boundary points are within the image of the first circular hole, a second circle including the maximally spaced-apart boundary points and having a radius of the second circular hole, and a first circle having a radius of the first circular hole and including two of the boundary points which spaced-apart the most from among a range of the boundary points of the partial image along an outer periphery of the image of the first circular hole, (e) defining, when the two maximally spaced-apart boundary points are located along the outer periphery the image of the first circular hole, the first and second circles as including the two maximally spaced-apart boundary points and as having respective centers of gravity which are symmetric to each other relative to a line segment connecting the maximally spaced-apart boundary points, and (f) detecting respective positions of the first and second circular holes based on the defined first and second circles.

* * * * *